United States Patent [19]
Spelt

[11] Patent Number: 5,848,494
[45] Date of Patent: Dec. 15, 1998

[54] SELF-WATERING APPARATUS FOR PLANT

[76] Inventor: Jacob Spelt, 1812 Pastel Crescent, Saanichton, Canada, V8M 1N6

[21] Appl. No.: 594,800

[22] Filed: Jan. 31, 1996

[51] Int. Cl.$^6$ .................................. A01G 9/02; A47G 7/02
[52] U.S. Cl. ................................ 47/67; 141/201; 141/83; 47/29
[58] Field of Search ......................... 47/67, 79; 141/201, 141/83

[56] References Cited

U.S. PATENT DOCUMENTS

| | | | |
|---|---|---|---|
| 2,501,727 | 3/1950 | Kubista | 137/68 |
| 3,293,799 | 12/1966 | Keller et al. | 47/38 |
| 3,808,385 | 4/1974 | Klinefelter | 200/61.04 |
| 3,910,300 | 10/1975 | Tal | 137/78 |
| 4,170,089 | 10/1979 | Smrt | 47/67 |
| 4,241,538 | 12/1980 | Lahr | 47/79 |
| 4,480,465 | 11/1984 | Chase | 73/73 |
| 4,562,959 | 1/1986 | Pointer, Jr. | 47/67 |
| 4,760,666 | 8/1988 | Han | 47/79 |
| 4,825,591 | 5/1989 | Han | 47/67 |
| 5,190,084 | 3/1993 | Diehl et al. | 141/83 |
| 5,273,082 | 12/1993 | Paasche et al. | 141/83 |
| 5,421,122 | 6/1995 | Hyndman | 47/67 |

FOREIGN PATENT DOCUMENTS

| | | | |
|---|---|---|---|
| 2819650 | 11/1979 | Germany | 47/79 C |
| 3207992 | 10/1983 | Germany | 47/79 C |
| 3331640 | 3/1985 | Germany | 47/79 C |
| 2190573 | 11/1987 | United Kingdom | 47/79 C |
| 2246418 | 1/1992 | United Kingdom | F16K 31/00 |
| 2281492 | 3/1995 | United Kingdom | 47/79 C |

*Primary Examiner*—Michael J. Carone
*Assistant Examiner*—Joanne C. Downs
*Attorney, Agent, or Firm*—Kelly Bauersfeld; Lowry & Kelley, LLP

[57] ABSTRACT

A fluid control apparatus is for controlling water supply to a potted plant and has a main valve responsive to weight of the potted plant. The apparatus comprises a main body to support the load of the plant, a valve body adapted to be suspended from a support, and a resilient member cooperating with the main body and valve body to be responsive to load of the plant acting on the main body. A delivery conduit receives water under relatively low pressure and flow of the water is controlled by the main valve. The main valve has a first valve portion, e.g. a valve seat on the valve body, and a second valve portion, e.g. a poppet valve. A valve adjuster, a critical valve area, and water pressure determine actuation of the main valve. Preferably, the main valve closes when load acting on the apparatus is a pre-determined load reflecting weight of the fully watered plant, and as the plant becomes lighter, opening of the valve is delayed to ensure delivery of a relatively large amount of water.

22 Claims, 3 Drawing Sheets

SELF-WATERING APPARATUS FOR PLANT

BACKGROUND OF THE INVENTION

The invention relates to an automatic apparatus for controlling water supply to potted plants, particularly a valve that is responsive to weight of the potted plant.

It is known to provide an automatic potted plant watering device in which a sensor, which is responsive to weight of a potted plant, controls water supply to the plant when the weight of the potted plant is less than a pre-determined amount. One example of such a device is found in U.S. Pat. No. 4,825,591 (Han) in which a potted plant is hung from a tension coil spring which is connected to a delivery valve which controls water flow from a storage tank to the plant. As the weight of the plant increases due to added water, the tension spring extends and the delivery valve is eventually actuated to close off the water flow. An externally mounted threaded adjustment wheel provides fine adjustment of a valve setting so that the valve is actuated at a particular pre-determined load. The valve is actuated by a direct mechanical connection spaced laterally from the spring and thus friction variations between the valve actuator and sliding portions associated with the spring could cause misalignment and erratic valve operation. In addition, if the weight of the potted plant is initially beyond the desired weight, for example due to initial manual over-watering, to avoid potential overloading of valve structure, the valve would have to be adjusted to accommodate the excess weight, after which it would have to be readjusted to attain the pre-determined load.

U.S. Pat. No. 2,501,727 (Kubista) discloses a drinking font for poultry in which a water container is supported on an external sleeve enclosing a coil spring. Because this font is not designed to water plants, it would require some considerable re-design to make it practical for such use. A conventional automobile tire air valve controls water flow through a hollow support, and an internally threaded collar is used for pre-loading the spring so as to select a pre-determined load which actuates the valve. The threaded collar is located within the structure and is frequently immersed in water and thus is prone to seizure. In addition, special tools may be necessary to access the collar and to turn it, which can present problems for unskilled operators. Thus, adjustment of the valve tends to be cumbersome, especially as adjustment of pre-loading of a spring tends to be difficult for fine adjustment. In addition, the automobile tire valve is essentially constantly immersed in water and is itself spring-closed, and thus would be prone to corrosion problems. In addition, the valve itself is relatively small and therefore prone to blockage from fine particles carried in the water supply.

In Applicant's opinion, both patented devices discussed above would not provide healthy or desirable watering regimes for plants because the valves controlling the water supply would likely open and close over a relatively narrow range of weights of the plants defined by the lighter weight which opens the valve, and the heavier weight which closes the valve. This would result in relatively frequent but short watering sessions with delivery of relatively small amounts of water during each session. It is well known that watering plants too frequently, with corresponding small amounts of water, discourages extensive root growth which can result in poor plant growth. In addition, both devices disclosed above require a relatively large number of parts, some of which are relatively fine and require accurate manufacturing and assembly and thus can be relatively costly to produce and maintain.

SUMMARY OF THE INVENTION

The invention reduces the difficulties and disadvantages of the prior art by providing a mechanically simple apparatus which can be adjusted to provide a desirable watering regime of relatively long watering sessions which deliver an adequate supply of water, interspersed by relatively long dry intervals of no water delivery. This apparatus can also accommodate a wide range of different weights of potted plants, thus increasing versatility of the device. As well, the invention provides an external adjustment for a main valve of the apparatus which can be finely adjusted without using special tools or dismantling the valve. In addition, the valve is simple and is generally self-aligning along a longitudinal axis, and thus there are no major off-axis forces which hinder smooth and predictable operation of the device. This enables the invention to be manufactured so as to be essentially free of any "sticking" tendency that can occur when the valve has not been actuated for some time which would otherwise tend to cause parts to seize.

A fluid control apparatus according to the invention comprises a main body, a valve body, a main valve, a resilient member and a valve adjuster. The main body is adapted to support a load and has upper and lower main body portions. The valve body is adapted to be suspended from a support, and has upper and lower valve body portions and a delivery conduit extending between the upper and lower valve body portions. The main valve cooperates with the delivery conduit to control fluid flow through the delivery conduit. The main valve has a first valve portion and a second valve portion cooperating with the first valve portion. The resilient member cooperates with the main body and the valve body to be responsive to load acting on the main body. The valve adjuster cooperates with the main valve to permit selection of a pre-determined load acting on the main body to actuate the main valve.

Preferably, the main valve opens when the load acting on the main body is somewhat less than the pre-determined load, and the main valve closes when the load acting on the main body attains the pre-determined load so that the difference in loads represents the desired amount of water delivered in a watering session. Also, the valve adjuster has an inner portion cooperating with the main valve, and an outer portion which is essentially unobstructed by the main body and the valve body to facilitate manual adjustment thereof.

In addition, the valve adjuster cooperates directly with the second valve portion and is disposed remotely from the resilient member. The main valve and the valve body are axially aligned with each other to reduce effects of off-axis forces.

A detailed disclosure following related to drawings, describes a preferred embodiment of the invention, plus some alternatives thereof. The invention is capable of expression in structure other than that particularly described and illustrated.

DETAILED DESCRIPTION

FIGS. 1–3

Figure 1:
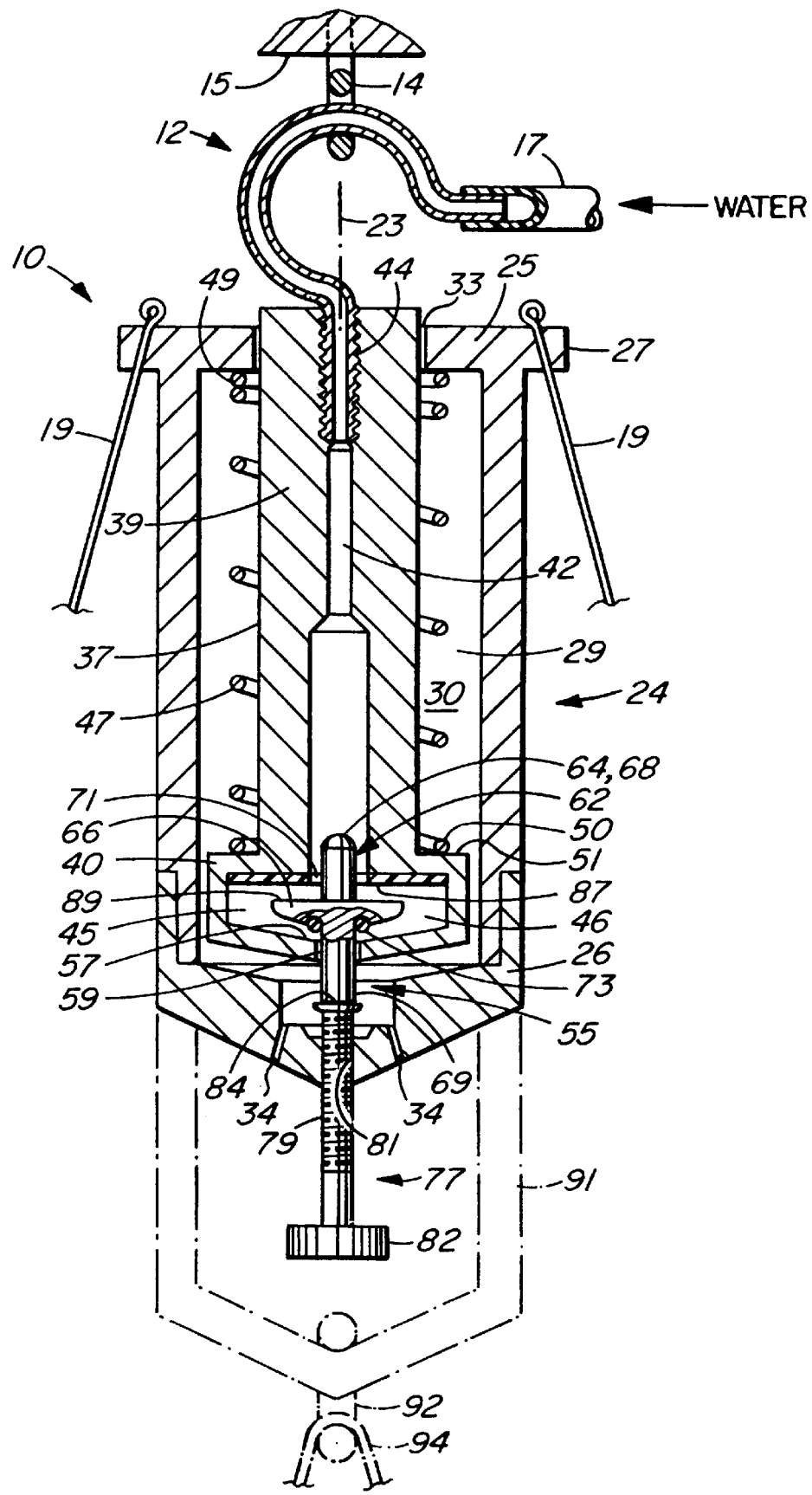
FIG. 1 is a simplified longitudinal section through a first embodiment of the invention, in which a main valve thereof is shown in an open position to supply water to a potted plant, and in which links supporting the potted plant are shown in full outline connected to an upper portion of the invention, and alternatively, the links are shown in broken outline connected to an alternative lower portion of the invention.

Referring mainly to FIG. 1, a fluid control apparatus 10 according to the invention has a suspension hook 12 extending upwardly therefrom and engaging a supporting ring or eye 14 extending downwardly from a ceiling or supporting surface 15. The hook 12 is hollow and provides a portion of a supply conduit which cooperates with a water supply line 17 for supplying water under low pressure to the apparatus. Upper portions of a plurality of support wires or links 19 cooperate with the apparatus 10 and have lower portions connected to a potted plant supported beneath the apparatus by the wires (lower portions of the wires and the potted plant not being shown) so as to receive water from the apparatus as will be described.

The apparatus 10 has a main body 24 having upper and lower main body portions 25 and 26 disposed symmetrically about a main longitudinal axis 23. The main body 24 has a generally circular cross-section and thus is generally cylindrical, and the upper portion 25 has a rim 27 with a plurality of openings spaced circumferentially therearound to receive the plurality of wires 19 so as to support the load of the potted plant. The main body has a hollow interior 29 defined by a body inner wall 30, and the upper and lower body portions 25 and 26 have upper and lower openings 33 and 34 respectively communicating with the interior.

The apparatus 10 further includes a valve body 37 having generally cylindrical upper and lower valve body portions 39 and 40 disposed generally symmetrically about the axis 23, and a delivery conduit 42 extending axially between the upper and lower valve body portions. An upper portion of the conduit 42 has an internally threaded side wall, which receives an externally threaded lower portion 44 of the hook 12 so as to secure the hook to the valve body so that the valve body can be suspended from the support. Thus the hook 12, which also serves as a supply conduit exposed to water under pressure, cooperates with the delivery conduit at the upper valve body portion. The supply conduit is shaped to permit suspension from the support so as to suspend the valve body and thus the remainder of the apparatus. The lower valve body portion has a valve chamber 45 defined by an interior wall 46 extending around the body portion 40 as will be described.

A compression coil spring 47 has an upper spring portion 49 held adjacent the upper portion 25 of the main body, and a lower spring portion 50 held adjacent a shoulder 51 of the lower valve body portion 40. Dimensions of the spring, the interior 29 and the valve body are selected so that spring 47 is lightly pre-loaded after assembly, and thus is subject to relatively low compression forces even when the apparatus 10 does not support the potted plant. The spring 47 has a selected spring rate to provide a controlled reduction in size when the weight of the potted plant increases due to added water as will be described. The spring encloses the valve body 37, and the valve body and spring are retained within the hollow interior 29. For convenience of manufacturing and installation, the lower portion 26 can be either bonded or screw threaded onto the upper portion 25 of the main body portion. It can be seen that the compression coil spring 47 serves as a resilient member cooperating with the main body and the valve body and is responsive to load from the potted plant acting on the main body as will be described.

The apparatus 10 further comprises a main valve 55 which is adapted to control flow through the delivery conduit 42, thus controlling water supplied to the potted plant. The main valve comprises a first valve seat 57 which is an annular, partially conical lower surface of the interior wall 46 extending around an outlet 59 of the delivery conduit, and serves as first valve portion of the main valve. The main valve has a second valve portion which comprises a main valve member 62 which is moveable with respect to the valve seat 57 to open and close the delivery conduit 42. The main valve member 62 is a poppet valve having an axially aligned valve stem 64 and a disc portion 66 surrounding the valve stem at a position intermediate of upper and lower ends of the valve stem. Thus, an upper stem portion 68 of the valve stem is received in a discharge portion 71 of the delivery conduit 42 above the valve chamber 45 with sufficient clearance extending therearound to permit water to pass around the upper stem portion 68 and sidewall of the conduit. The valve stem 64 has a lower stem portion 69 which is received in the outlet 59 of the delivery conduit so that the valve stem 64 extends axially outwardly and downwardly from the valve seat 57. The stem portion 69 similarly has adequate clearance extending therearound to permit water to pass between the valve stem and the outlet 59. The disc portion 66 has an O-ring seal 73 passing around the lower stem portion 69 of the stem and is held adjacent the lower surface of the disc portion. The O-ring seal 73 has a critical size as will be explained, and cooperates with the valve seat 57 to close the main valve as required, and thus provides a first sealing portion of the valve member which is complementary to the first valve seat.

The apparatus further comprises a valve adjuster 77 which has an inner portion 79 comprising a threaded shaft which is received within a complementary threaded opening 81 in the lower main body portion 26 and disposed on the axis 23 of the apparatus. The valve adjuster 77 has an outer portion 82 which is a knurled knob to facilitate manual adjustment of the valve adjuster by rotating the adjuster with respect to the main body. It can be seen that the outer portion of the valve adjuster is essentially unobstructed by the main body and the valve body so as to facilitate manual adjustment of the valve, thus contrasting with the internally located valve adjustment disclosed in said U.S. Pat. No. 2,501,727 (Kubista). The inner portion 79 of the stem has an end face 84 which contacts the lower portion 69 of the valve stem to control relative position of the valve member 62. As shown in FIG. 1, the valve member 62 is held clear of the valve seat 57 by the adjuster 77 which occurs when the spring 47 is subjected to a load somewhat less than a pre-determined load, which indicates that the plant requires water, as will be described. Thus, weight of the fully watered plant is defined as the pre-determined load which compresses and is sustained by the spring when the plant is supported by the apparatus. In this raised position of the valve member there is a clear passage from the conduit 42, around the valve member 62 by passing through the discharge portion 71 and the outlet 59 into the interior 29, and then out through the lower openings 34 of the main body.

An upper portion of the interior wall 46 of the valve chamber 45 has a second valve seat 87 extending around the discharge portion 71 of the delivery conduit 42 into the valve chamber 45. The seat 87 is a resilient, flat annular surface and is disposed oppositely to the first valve seat 57. The disc portion 66 of the poppet valve has an upper surface 89 which is also generally flat and complementary to the second valve seat 87 to provide a second sealing portion on a side of the poppet valve remote from the first sealing portion. Thus, the second sealing portion cooperates with the second valve seat to seal the delivery conduit on an upstream side of the valve chamber 45, whereas the first valve portion seals the delivery conduit on a downstream side of the valve chamber. Clearly, in an alternative, an O-ring seal can be fitted on the poppet valve, or as a substitute for the seat 87.

Figure 2:
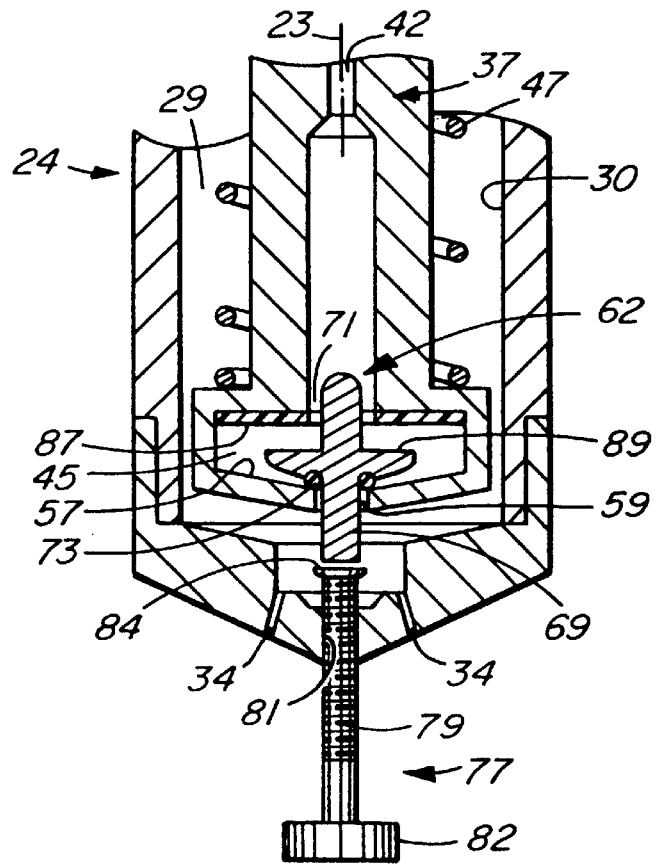
FIG. 2 is a simplified fragmented longitudinal section generally similar to FIG. 1, showing a lower structure only of the invention, with the main valve thereof being shown in a closed lower position which is attained when the potted plant is fully watered.

Referring to FIG. 2, as load of the potted plant increases due to supply of water, overall effective length of the compression spring 47 gradually shortens and the main body 24 moves downwardly with respect to the valve body 37. Because the valve member 62 is supported on the valve adjuster 77 which is connected to the main body, the valve member 62 moves downwardly with respect to the valve body. Eventually, the seat 57 contacts the seal 73 and force between the end face 84 of the valve adjuster 77 and the lower portion 69 of the stem decreases considerably to essentially zero, so that downward force on the valve is sustained essentially completely by the seat. For clarity, in FIG. 2, the stem is shown clear of the end face, although in practise this is not likely to happen. When the O-ring seal 73 of the first sealing portion contacts the first valve seat 57, the delivery conduit 42 is closed on a downstream side of the valve chamber. This reflects the position which is attained when the potted plant is fully watered and its weight approximately equals or slightly exceeds the pre-determined load, although if the load is exceeded by a small amount, neither the spring 47 nor valve is damaged. This lack of damage due to overload contrasts with some of the prior art devices where exceeding the pre-determined load can damage the valve or other portions of the devices.

Figure 3:
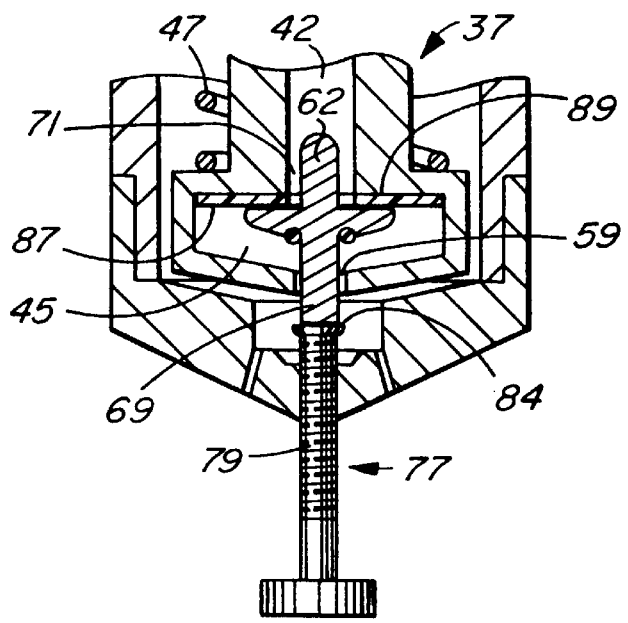
FIG. 3 is a simplified fragmented longitudinal section of a lower portion of the invention generally similar to FIG. 2, with the main valve thereof shown in a closed upper position which is attained when the potted plant is removed from the invention.

Referring to FIG. 3, the end face 84 of the valve adjuster 77 is shown contacting the lower stem portion 69, and the upper surface 89 of the disc portion 66 is shown contacting the second valve seat 87, thus closing the discharge portion 71 of the delivery conduit at a position upstream of the valve chamber 45. This position is attained only if load on the apparatus is reduced considerably, typically when the potted plant has been removed from the supporting wires 19, and would not happen with a normally dry plant. In this position, water in the delivery conduit is prevented from leaving the valve apparatus, thus preventing waste of water if the potted plant is removed for whatever reason.

OPERATION

In operation, the apparatus is suspended by the hook 12 from the support ring or eye 14, with the potted plant, not shown, hanging from the wires 19 below the apparatus. A flexible plastic hose with an internal diameter of approximately 3/16 inch (4.7 mm) acts as the water supply line 17, and receives water from a pressure controlled water supply, which can be attained by connecting a pressure regulator to a conventional domestic water supply. Preferably, the regulator limits water pressure to approximately 18 psi (1.2 atmospheres), and an optional adjustable pressure regulator would provide an added advantage of greater range of options, as will be described. If desired, this same hose can supply water to other apparatuses similar to the apparatus 10 using, for example, "T" connections. Alternatively two or more plants can be supplied through a pressurized manifold, or an elevated holding tank to provide the supply pressure, each of the plants being connected with the hose or the supply line 17 to the manifold.

Because there is no provision for adjusting force from the compression spring 47, the spring is first selected so that the main valve is opened when the potted plant is less than a pre-determined weight, which typically can be between about 4 pounds and 20 pounds (1.8 and 9 kg). One example of the spring 47, which was able to accommodate a potted plant weight range of between about 3 and 18 pounds, was 1.75 inches long (44 mm) with an internal diameter of 0.75 inches (19 mm) and a wire diameter of about 0.08 inches (2 mm). This spring compressed about 1 inch (25 mm) when subjected to an 18 pound (8.2 kg) force. The valve adjuster 77 had a full range of adjustment of about 1 inch (25 mm).

Assuming the potted plant is insufficiently watered when it is first hung from the apparatus, the apparatus will assume a position somewhat similar to FIG. 1 in which the valve member 62 contacts the valve adjuster 77 so that the O-ring seal 73 is clear of the first valve seat 57. In this position water can pass through the supply conduit in the hook 12, down the conduit 42, through the discharge portion 71 into the valve chamber 45, through the outlet 59 and finally through the openings 34 to water the plant. The spring has a spring rate as exemplified above so to as to deflect sufficiently to actuate the main valve when an adequate supply of water has been delivered to the plant.

As stated earlier, to encourage root growth, preferably plants should be watered with relatively large amounts of water separated by relatively long dry intervals, rather than smaller amounts of water at shorter intervals. With some prior art plant watering devices, the automatic valve appears to have response characteristics which would tend to deliver small amounts of water at relatively short intervals, and there is little or no provision to adjust this frequency of watering. In contrast, in the present invention, the apparatus has a deliberate time delay to increase the time interval between watering sessions, which is established by selecting appropriate water supply pressure and size of a critical area of the main control valve, the critical area being defined by a circular area enclosed by the O-ring seal 73.

The time delay is attained because the main valve member 62 is held against the seat 57 primarily by water pressure, which is a combination of hydrostatic pressure due to the "hydrostatic head" of water, plus water supply pressure. When the valve opens, upwards force on the stem must exceed combined pressure forces, and thus a suitable time delay can be obtained by selecting the appropriate combination of supply water pressure and size of the O-ring seal 73. Clearly, the higher the supply pressure, or the larger the seal 73, the greater the upwards force from the valve adjuster that can be sustained by the valve member before snapping open suddenly to discharge water through the outlet 59 and the openings 34 onto the plant. A typical water volume added to the plant in any watering session can be between about 1 and 2 pints (between 0.6 liters and 1.2 liters) which corresponds to a range of water weights of between about 1.2 and 2.5 pounds (0.6 and 1.2 kilograms). When the plant has been fully watered, the spring 47 is compressed sufficiently so that the main body moves downwardly with respect to the valve body so that upwards force on the valve member gradually reduces until it is negligible, as force on the valve stem is carried by the O-ring seal 73. In this position, the end face 84 of the valve adjuster is barely separated from the lower stem portion 69, so that the valve member attains the lowermost closed position thereof, which is shown in FIG. 2 with an exaggerated clearance between the stem and adjuster. In this position the outlet 59 of the delivery conduit is closed by the O-ring seal 73.

Depending on the plant characteristics, ambient temperature and humidity, weight of the potted plant gradually decreases as water content is reduced. Eventually upwards force from the lower stem portion 69 acting on the inner portion 79 of the valve adjuster again overcomes water pressure forces and suddenly lifts the valve member 62 until it attains the position shown in FIG. 1, in which the O-ring seal 73 is again clear of the first valve seat 57, thus opening the outlet 59 of the delivery conduit. This permits water to once again flow through the outlet 59 and lower openings 34 to be discharged onto the potted plant as before.

The difference in the two extremes of load experienced by the spring represents weight of the potted plant before and after watering, which in turn represents the amount of water delivered in a single watering session. Thus, there can be a relatively large gap, typically equivalent to one or two pints of water, between the load at which the valve opens to admit water, and the load at which the valve closes to stop the supply of water. The pre-determined load is controlled by relative position of the valve adjuster and valve stem, whereas the volume of water delivered during any watering session is dependent on the time delay prior to opening, which in turn is dependent on relationship between water pressure and valve area. Thus, cooperation between the valve adjuster and the main valve permits selection of the pre-determined load acting on the main body to close the main valve. The screw threads of the valve adjuster are sufficiently fine so that small amounts of rotation of the valve adjuster permit very accurate setting of the position of the main valve when it closes. Thus, it can be seen that the main valve 55 opens when the load acting on the main body is somewhat less than the pre-determined load, and the main valve closes when the load acting on the main body attains the pre-determined load.

Determination of the desired moisture content of the fully watered plant, and its corresponding weight, usually requires some experimental adjustment of the valve, and this can be done easily without requiring any tools, thus contrasting with some prior art devices. It can be seen that the valve adjuster 77 cooperates directly with the second valve portion, that is the poppet valve 62, and is disposed remotely from the resilient member or spring 47, so that selective movement of the valve adjuster 77 with respect to the main body 24 does not effect directly spring rate of the resilient member and thus operates independently thereof. Clearly, the valve adjuster cooperates with the first valve portion of the main valve to separate the valve portions to open the main valve when water is required. It can be seen that spacing between cooperating portions of the valve adjuster and the first valve portion is selectively adjustable, at least when the main valve is closed, to permit selection of the pre-determined load supported by the main body which is required to actuate the main valve. In view of the number of variables discussed above, it is possible to select a watering regime which is compatible with a wide range of plant types, and a wide range of weights of fully watered potted plants. This flexibility of water volume delivered during a watering session and the dry interval between watering sessions avoids the problems of some prior art devices which water a plant with frequent small amounts, which occurs when there is no time delay, as described above.

Clearly there are some other variations in opening and closing of the valve due to spring hysteresis and dimensional tolerances, etc., but this is not critical for normal plant watering operations. It is noted that the valve body 37 is considerably smaller than adjacent portions of the main body so as to essentially prevent contact therewith. In addition, the main body and the valve body are axially aligned with each other so as to reduce the effects of any off-axis forces which might otherwise cause inadvertent contact between the valve body and the main body, which otherwise would introduce frictional variations and corresponding variations in opening and closing of the valve.

Figure 4:
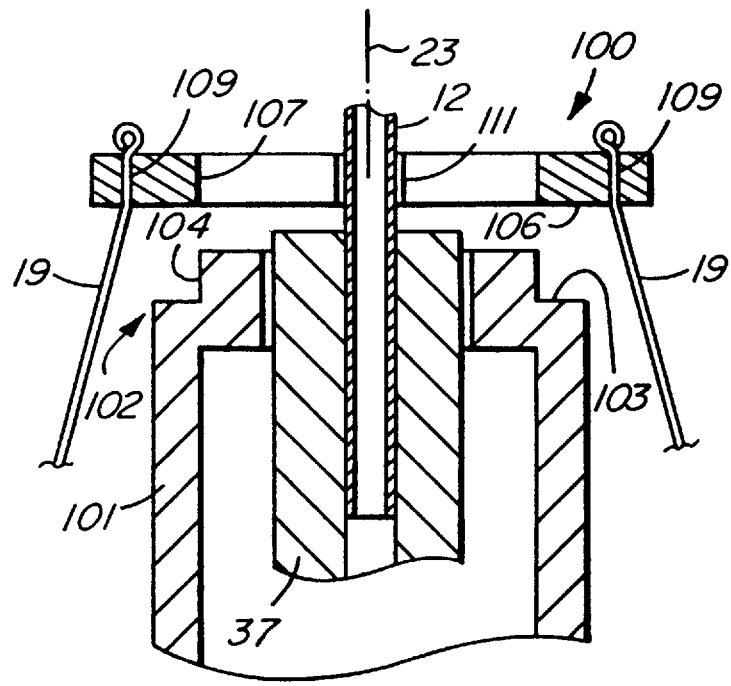
FIG. 4 is a simplified fragmented longitudinal section showing the upper portion of the invention, with alternative means of connecting the links and potted plant thereto which is particularly applicable for commercial growers.

Referring to FIG. 3, the upper surface 89 of the valve is shown in contact with the second valve seat 87 which occurs when the potted plant is too light for the spring strength, in which case the valve adjuster can be "backed-off" to lower the end face 84 to permit the valve to seat correctly. This position can also be obtained when the potted plant has been removed from the apparatus. As will be described with reference to FIG. 4, the plant can be removed easily from the apparatus 10, and in these instances it is convenient if the valve automatically shuts off, thus preventing uncontrolled flow of water from the apparatus. This alternative valve closure is attained in the position shown in FIG. 3 wherein the poppet valve 62 is supported on the valve adjuster 77 and the upper surface 89 contacts the second valve seat 87, thus sealing the conduit 57 at the discharge portion 71. Sealing force is maintained by load of the spring 47 acting on the valve member, and clearly the valve member is sufficiently strong to resist pre-load forces in the spring.

Figure 5:
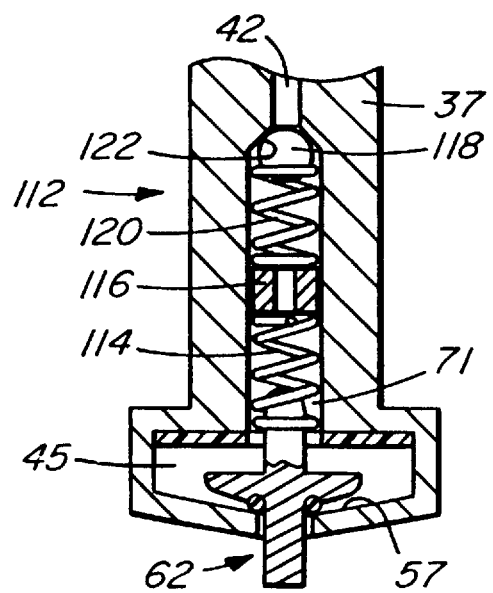
FIG. 5 is a simplified, fragmented longitudinal section through an intermediate portion of a second embodiment of the invention fitted with an optional spring-closed supply valve, and an optional spring to assist in closure of the main valve.

Thus, it can be seen that spacing between the oppositely facing first and second valve seats is sufficient to enable axial movement of the poppet valve between the lowermost position thereof, attained when the spring is fully compressed at the pre-determined load, and an upper position thereof when the spring is lightly compressed, or merely under a light pre-load when the plant has been removed. This axial movement of the poppet valve 62 can be approximately 0.2 inches (5 mm) depending on the spring rate and other factors. It can be seen that, when the main valve is closed in the lower position of the poppet valve, it is held against the valve seat by gravity and water pressure, e.g. hydrostatic pressure and delivery pressure of water in the delivery conduit. While this sealing is adequate for many purposes, in some instances sealing force in addition to gravity and water pressure is desirable, as will be described with reference to FIG. 5.

ALTERNATIVES

According to FIG. 1, the wires 19 are connected to the upper main body portion 25 which is appropriate where height of the plant, and length of the wires are compatible. In other instances, e.g. for a tall plant and/or short wires 19, it might be more convenient to suspend the plant from a position below the apparatus 10. This is particularly important in commercial greenhouses where quick removal of the potted plant is important. This alternative is attained by eliminating the connection of the wires 19 to the upper portion, and instead substituting an extension connection 91 shown in broken outline in FIG. 1. The extension connection is U-shaped and can be integral with the lower main body portion 26, or can be releasably connected thereto as required. In any event, adequate clearance is provided to facilitate access to the knurled knob 82 for rotating the knob to adjust the valve. The potted plant can be connected to the extension connection 91 by a ring or hook 92, shown in broken outline, from which alternative support wires or links 94 extend.

FIG. 4

To facilitate removal of the plant from the apparatus 10, an alternative support ring 100 is substituted for the connections between the wires 19 and the upper main body portion 25 as shown in FIG. 1. The ring 100 is used in combination with an alternative main body 101 which has an alternative upper main body portion 102 which provides a ring seat 103 and annular shoulder 104. The support ring 100 has a lower surface 106 which rests on the seat 103, and an inner cylindrical surface 107 which engages the annular shoulder 104. The ring has an outer periphery having a plurality of openings 109 which receive the wires or links 19 threaded therethrough which extend downwardly to the potted plant, not shown. The ring has an essentially continuous circumference apart from a radial gap 111 which is sufficiently wide to freely accept the suspension hook 12 extending from the valve body 37. The gap 111 enables the ring to be lifted upwardly to be clear of the seat 103 and shoulder 104, after which it can be drawn radially outwardly, with the hook 12 passing through the gap 111.

FIG. 5

Clearly, from the above it can be seen that maintenance of a particular supply pressure which is sufficient to close the main valve is important for accurate operation of the apparatus and any significant variations, particularly a drop in supply pressure, can effect watering accuracy. The valve body 37 of FIGS. 1 through 3 can be fitted with an optional supply valve 112 which is desirable to provide an additional means of preventing unintentional flow of water from the apparatus which can occur when water pressure in the supply line 17 is relatively low and is insufficient to close the main valve. Low supply pressure can occur in situations where a plurality of valve apparatuses according to the invention are located upstream and at irregular intervals draw water from the line, thus periodically reducing delivery pressure to any downstream valves. In an instance when one or more of the other valve apparatus is open, line pressure drops and closing force on the valve member 62 due to water pressure may be insufficient to provide positive closure of the main valve when desired. The optional supply valve 120 can positively close the delivery conduit to maintain internal pressure in the valve chamber 45 and thus keep the main valve closed during supply pressure drops to prevent inadvertent watering of the plant. This is attained for a small increase in complexity and without interfering with accurate delivery of water to the plant when proper supply pressure is resumed.

In addition, to further enhance closure of the main valve, a relatively light main valve spring 114 can be fitted to urge the main valve member 62 against the first valve seat 57. An annular spring stop 116 is fitted within the delivery conduit 42 and has upper and lower surfaces surrounding a central bore which delivers fluid therethrough. The main valve spring 114 is located between the spring stop 116 and the poppet valve. Thus, force from water pressure acting on the valve member 62 to hold the valve member against the first valve seat is augmented slightly by force from the spring 114. The main valve spring has a lower portion enclosing the upper stem portion so as to cooperate with the poppet valve to urge the poppet against the first valve seat.

The supply valve 112 has a valve member 118, for example, a ball, and a supply valve spring 120 extending between the ball and the spring stop 116. The delivery conduit has a partially conical supply valve seat 122 extending therearound. The seat 122 is thus generally complementary to the ball 118, and is sealed under relatively low force by the spring 120 urging the ball against the seat. Thus the supply valve cooperates with the delivery conduit and is located upstream of the main valve to close the delivery conduit when supply pressure is below a pre-determined amount.

It can be seen that the spring stop 116 can be easily fitted in the delivery conduit 42, e.g. by an interference fit or by screw threads. The supply valve spring 120 is located on one side of the stop to urge the main valve member 62 against the first valve seat 57, and the supply valve spring 120 is located on an opposite side of the stop to urge the supply valve member against the supply valve seat. This simplifies construction and installation and provides additional sealing for low water pressure situations.

I claim:

1. A fluid control apparatus comprising:
   (a) a main body adapted to support a load, the main body having upper and lower main body portions,
   (b) a valve body adapted to be suspended from a support, the valve body having upper and lower valve body portions and a delivery conduit,
   (c) a main valve cooperating with the delivery conduit to control fluid flow through the delivery conduit, the main valve having a first valve portion fixed relative to the valve body, and a second valve portion movable relative to the first valve portion to control said fluid flow,
   (d) a resilient member cooperating with the main body and the valve body to be responsive to load supported by the main body, and
   (e) a valve adjuster mounted on the main body for selective movement with respect to the main body, and disposed remotely from the resilient member so that said selective movement does not directly affect the resilient member when the apparatus supports the load, the valve adjuster cooperating with the second valve portion of the main valve to separate the valve portions to open the main valve when water is required, spacing between cooperating portions of the valve adjuster and the second valve portion being selectively adjustable to permit selection of a predetermined load supported by the main body which is required to actuate the main valve.

2. An apparatus as claimed in claim 1 in which:
   the main valve opens when the load acting on the main body is somewhat less than the pre-determined load, and
   the main valve closes when the load acting on the main body attains the pre-determined load, so that the difference in load represents the desired amount of water delivered in a watering session.

3. An apparatus as claimed in claim 1, in which:
   the valve adjuster has an inner portion cooperating with the main valve, and an outer portion which is essentially unobstructed by the main body and the valve body to facilitate manual adjustment thereof.

4. An apparatus as claimed in claim 1, in which:
   the valve adjuster contacts the second valve portion.

5. An apparatus as claimed in claim 1, in which:
   the main valve and the valve body are axially aligned with each other to reduce effects of off-axis forces.

6. An apparatus as claimed in claim 1, in which:
   the main body has a hollow interior and the upper and lower main body portions have upper and lower openings communicating with the interior, and
   the valve body is located within the interior of the main body.

7. An apparatus as claimed in claim 1, in which:

the first valve portion of the main valve comprises a first valve seat extending around the delivery conduit, and the second valve portion of the main valve comprises a valve member which is movable with respect to the first valve seat to open and close the delivery conduit.

8. An apparatus as claimed in claim 7, in which:

the said valve member is a poppet valve having a stem and a first sealing portion, the sealing portion being complementary to the first valve seat, and the stem extending axially outwardly from the first valve seat, and the valve adjuster cooperates with the main body, and has an inner portion cooperating with the stem of the poppet valve and an outer portion extending outwardly from the main body to facilitate manual adjustment.

9. An apparatus as claimed in claim 8, in which:

the valve body has a valve chamber communicating with the delivery conduit, the valve chamber having an interior defined in part by an interior wall, and the first valve seat cooperates with the interior wall and extends around the delivery conduit in the chamber.

10. An apparatus as claimed in claim 9, in which:

the interior wall of the valve chamber has a second valve seat cooperating therewith and being disposed oppositely to the first valve seat, and the poppet valve has a second sealing portion on a side of the poppet valve remote from the first sealing portion, the second sealing portion cooperating with the second valve seat to stop water flow when the load is removed.

11. An apparatus as claimed in claim 8, further comprising:

a main valve spring enclosing a portion of the valve stem and cooperating with the poppet valve to urge the poppet valve against the first valve seat, so as to close the delivery conduit.

12. An apparatus as claimed in claim 11, further comprising:

a supply valve cooperating with the delivery conduit and located upstream of the main valve, the supply valve having a supply valve member, a supply valve seat extending around the delivery conduit, and a supply valve spring, and a spring stop fitted in the delivery conduit, the supply valve spring extending between the supply valve member and the spring stop so as to urge the supply valve member against the supply valve seat so as to close the delivery conduit when supply pressure is below a pre-determined pressure, and the main valve spring extending between the spring stop and the main valve member so as to close the main valve member as required.

13. An apparatus as claimed in claim 7, in which:

the valve member is resiliently urged against the first valve seat so as to close the delivery conduit.

14. An apparatus as claimed in claim 1, in which:

a supply conduit exposed to water under pressure cooperates with the delivery conduit at the upper valve body portion.

15. An apparatus as claimed in claim 11, in which:

the supply conduit is shaped so as to permit suspension from the support, so as to suspend the valve body.

16. An apparatus as claimed in claim 1, further comprising:

a supply valve cooperating with the delivery conduit and located upstream of the main valve to close the delivery conduit when supply pressure is below a pre-determined amount.

17. An apparatus as claimed in claim 16, in which:

the supply valve has a supply valve member, a supply valve seat extending around the delivery conduit and a supply valve spring, the supply valve spring urging the supply valve member against the supply valve seat so as to close the delivery conduit.

18. A fluid control apparatus comprising:

(a) a main body adapted to support a load, the main body having upper and lower main body portions, (b) a valve body adapted to be suspended from a support, the valve body having upper and lower valve body portions and a delivery conduit extending between the upper and lower valve body portions, (c) a main valve cooperating with the delivery conduit to control fluid flow through the delivery conduit, the main valve having a first valve portion and a second valve portion cooperating with the first valve portion, the first valve portion of the main valve comprising a first valve seat extending around the delivery conduit, and the second valve portion of the main valve comprising a poppet valve which is movable with respect to the first valve seat to open and close the delivery conduit, the poppet valve having a stem and a first sealing portion, the sealing portion being complementary to the first valve seat, and the stem extending axially outwardly from the first valve seat, (d) a resilient member cooperating with the main body and the valve body to be responsive to load supported by the main body, and (e) a valve adjuster cooperating with the main valve and the main body, the valve adjuster having an inner portion cooperating with the stem of the poppet valve and an outer portion extending outwardly from the main body to facilitate manual adjustment to permit selection of a pre-determined load supported by the main body to actuate the main valve.

19. An apparatus as claimed in claim 18, in which:

the valve body has a valve chamber communicating with the delivery conduit, the valve chamber having an interior defined in part by an interior wall, and the first valve seat cooperates with the interior wall and extends around the delivery conduit in the chamber.

20. An apparatus as claimed in claim 19, in which:

the interior wall of the valve chamber has a second valve seat cooperating therewith and being disposed oppositely to the first valve seat, and the poppet valve has a second sealing portion on a side of the poppet valve remote from the first sealing portion, the second sealing portion cooperating with the second valve seat to stop water flow when the load is removed.

21. An apparatus as claimed in claim 18, further comprising:

a main valve spring enclosing a portion of the valve stem and cooperating with the poppet valve to urge the poppet valve against the first valve seat, so as to close the delivery conduit.

22. A fluid control apparatus comprising:

(a) a main body adapted to support a load, the main body having upper and lower main body portions, (b) a valve body adapted to be suspended from a support, the valve body having upper and lower valve body portions and a delivery conduit extending between the upper and lower valve body portions, (c) a main valve cooperating with the delivery conduit to control fluid flow through the delivery conduit, the main valve having a first valve portion and a second valve portion cooperating with the first valve portion, (d) a resilient member cooperating with the main body and the valve body to be responsive to load supported by the main body, (e) a valve adjuster cooperating with the main valve to permit selection of a pre-determined load supported by the main body to actuate the main valve, and (f) a supply valve cooperating with the delivery conduit and located upstream of the main valve to close the delivery conduit when supply pressure is below a pre-determined pressure, the supply valve having a supply valve member, a supply valve seat extending around the delivery conduit and a supply valve spring, the supply valve spring urging the supply valve member against the supply valve seat so as to close the delivery conduit.

* * * * *